United States Patent [19]

Björntegaard

[11] Patent Number: 5,990,961
[45] Date of Patent: *Nov. 23, 1999

[54] METHOD FOR COMPRESSION ENCODING OF DIGITAL PICTURE VIDEO SIGNALS, USING CO-ENCODING OF BLOCKS FROM SEVERAL PICTURES

[75] Inventor: Gisle Björntegaard, Myrvoll, Norway

[73] Assignee: Telenor AS, Kjeller, Norway

[*] Notice: This patent issued on a continued prosecution application filed under 37 CFR 1.53(d), and is subject to the twenty year patent term provisions of 35 U.S.C. 154(a)(2).

[21] Appl. No.: 08/809,774

[22] PCT Filed: Sep. 27, 1995

[86] PCT No.: PCT/NO95/00172

§ 371 Date: Jun. 5, 1997

§ 102(e) Date: Jun. 5, 1997

[87] PCT Pub. No.: WO96/10316

PCT Pub. Date: Apr. 4, 1996

[30] Foreign Application Priority Data

Sep. 29, 1994 [NO] Norway ..................................... 943628

[51] Int. Cl.$^6$ ............................................. H04N 7/32
[52] U.S. Cl. ........................................ 348/416; 348/420
[58] Field of Search .................................. 348/348, 390, 348/400–402, 407, 409–413, 415, 416, 420, 699; 382/232, 236, 238; H04N 7/137, 7/32

[56] References Cited

U.S. PATENT DOCUMENTS 5,173,773  12/1992  Ueda et al. ............................. 348/407
5,198,901  3/1993   Lynch .
5,212,549  5/1993   Ng et al. ................................. 348/409
5,293,229  3/1994   Iu ........................................... 348/415
5,453,801  9/1995   Kim ........................................ 348/699
5,510,840  4/1996   Yonemitsu et al. ..................... 348/402

OTHER PUBLICATIONS

Signal Processing: Image Communication, vol. 2, No. 2, Aug. 1990 (The Netherlands), A. Puri et al., "Video Coding With Motion–Compensated Interpoliation for CD–ROM Applications", pp. 127 —pp. 144, see especially pp. 131–132.

Signal Processing: Image Communication, vol. 2, No. 2, Aug. 1990 (The Netherlands), Atsushi Nagata et al., "Moving Picture Coding System for Digital Storage Media Using Hybrid Coding", pp.109 —pp. 116, see especially pp.112–113.

*Primary Examiner*—Richard Lee
*Attorney, Agent, or Firm*—Wenderoth, Lind & Ponack, L.L.P.

[57] ABSTRACT

In a digital picture video signal compression encoding process for transmitting such signals via a narrowband transmission medium, two or more pictures are co-encoded by encoding/decoding blocks having the same picture position, together. First, the block of the last picture is encoded/decoded, and thereafter the decoded result in this block is used as a prediction for the remaining blocks, together with information from previously decoded pictures. Preferably one single shift/movement vector is used in order to indicate a prediction for several blocks. In addition, transform coefficients representing difference signals to be transmitted, are interwoven from the blocks to be co-encoded, so that the transmission format for transforming coefficients will be the same as when encoding/decoding one block.

3 Claims, 4 Drawing Sheets

PREDICTION OF ORIG1 FROM PRED4 AND PARTS OF ORIG2'

METHOD FOR COMPRESSION ENCODING OF DIGITAL PICTURE VIDEO SIGNALS, USING CO-ENCODING OF BLOCKS FROM SEVERAL PICTURES

BACKGROUND OF THE INVENTION

The present invention relates to a method for encoding digital picture video signals in order to reduce the amount of data possibly to be transmitted. More particularly, the invention concerns how to encode more than one picture at the same time, or more precisely, how to encode a number of blocks from different pictures simultaneously.

Several standard methods exist for compressing video signals. In a number of these methods (ITU recommendation H.261 and ISO/IEC 11172) the following techniques are substantially utilized in order to achieve compression of the data to be transmitted:

1. The pictures, which consist of a number of pixels, are divided into a number of blocks consisting of, for example, 8×8 or 16×16 pixels. The size utilized depends on what is to be performed.

2. Since pictures following each other in direct temporal succession often are relatively similar, a picture block can often be approximately described by using parts of previously encoded pictures. If one presupposes that a block of 8×8 pixels is to be encoded, wherein this block is referred to as ORIG(i,j) wherein i,j=1 . . . 8, one will search for a suitable block of 8×8 pixels in a previously encoded picture. This block in the previously encoded picture will typically have a shifted position in the picture as compared to ORIG, which fact reflects movements in the picture content. The magnitude of the shift is indicated by means of a so-called vector stating the number of pixels along which the block has been shifted in a horizontal and a vertical direction. The block which has been found to be rather similar to the ORIG block is referred to as a prediction for the ORIG block, and it is defined as PRED(i,j), wherein i,j=1 . . . 8. Algorithms exist for finding a best possible PRED block in a previously encoded picture, however such algorithms are not herein discussed in detail, since detailed formulations of such algorithms do not constitute any part of the present invention.

3. Since a receiver itself is capable of generating PRED (the receiver has stored the necessary previously reconstructed encoded/decoded pictures, and the receiver itself is also able to compute PRED in accordance with the same algorithm as the transmitter), there is no need to transmit the full ORIG. It is sufficient to transmit a so-called difference signal defined as follows:

DIFF(i,j)=ORIG(i,j)−PRED(i,j) i, j=1 . . . 8.

4. In order to transmit DIFF in a form as highly compressed as possible, one usually converts the DIFF block (which in the present example is 8×8 pixels) into a matrix which contains 8×8 transform coefficients which thus represent DIFF. To a large degree, the so-called two-dimensional Cosine transform is utilized which has favorable characteristics. The transform coefficients obtained by transforming DIFF are referred to as TRANS, and are defined as follows:

TRANS(i,j) i,j=1 . . . 8.

5. Subsequent to transforming DIFF into TRANS, the transform coefficients are quantized, and the transformed and quantized coefficients, which through quantizing now constitute an approximate representation of DIFF, can then be transmitted to a receiver in accordance with a certain matrix reading strategy (for example see the reading strategy and formatting into transmittable data described in Norwegian patent no. 175,080 belonging to the same applicant as in the present invention). In the receiver, inverse quantizing and inverse transforming are performed in order to reconstruct DIFF. However, in actuality the reconstructed values DIFF' deviate somewhat from DIFF. The reason for the deviation is the quantization. It is to be noted that the two last mentioned operations must be made in an equal manner at both the transmitting and the receiving sides. The obtained DIFF' values are utilized for reconstructing a representation ORIG' of the picture block which was to be encoded:

ORIG'(i,j)=PRED(i,j)+DIFF'(i,j) i,j=1 . . . 8.

When picture compression is implemented, it is necessary both to compress in order to represent the pictures by as few bits as possible, and de-compress to be able to display the pictures again. An expression often used is that compression is undertaken at the transmitter side, and de-compression is undertaken at the receiver side. The calculation operations to be performed are therefore also divided in two parts quite naturally such that one set of operations is for the transmitter and one set of operations is for the receiver. The calculation operations at the transmitter side, which roughly comprise finding a prediction, constructing a difference signal, making a transformation and finally preparing a bit stream, is usually referred to as "encoding". Thus, it is referred to encoding, for example, a block or a complete picture. In the same manner the calculating operations at the receiver side are referred to as "decoding", which operation roughly comprises finding the prediction from a received vector, making an inverse transformation, and assembling the picture for display. Encoding and decoding are in reality closely connected since an encoding process followed by a decoding process shall lead to a reconstructed picture. It is important to note that the transmitter must also undertake large parts of the decoding process because the transmitter and the receiver must have exactly the same reconstructed pictures as a basis for the predictions.

From what has been stated above, many of the calculating operations used in compression will be reflected both at the encoding side and the decoding side (this relates, for example, to "run patterns" for coefficients, wherein the same run pattern is used both at the transmitter side and the receiver side). The present invention deals with such operations which must be made both at the transmitter and the receiver sides. Often when talking about "encoding", one will thus actually include both encoding and decoding. This holds valid also regarding parts of this invention as herein described and as defined by the appended claims.

In the ISO/IEC 11172 and ISO/IEC 13818 standards for picture compression, different picture types are utilized. These types are largely characterized by the manner of preparing predictions of blocks. In the cases where a picture is encoded without using any prediction, the designation "I pictures" is used. In the case where a prediction from one previously decoded picture is used, the picture being encoded is designated as a "P picture" (P meaning predicted). A third type of picture is a "B picture" (B meaning two-way or "bidirectional" prediction). In order to encode a B picture, information from two previously decoded pictures, one of which being ahead of and one of which succeeds the picture to be encoded, is used as a prediction.

FIGS. 1 and 2 illustrate how to prepare a prediction of blocks if there is a situation with a mixture of P and B pictures. It is presumed that picture 1 has been transmitted to the receiver. This cannot have been a B picture. The next to happen is that the whole of picture 3 will be encoded. Predictions for the blocks in picture 3 can be found in picture 1, and an example is shown by the block ORIG2 in picture 3 finding its prediction as block PRED1 in picture 1. The movement vector (shift vector) describing the position of PRED1 in relation to ORIG2, is V1. In a corresponding manner, predictions in picture 1 are found for all blocks in picture 3, i.e. a set of movement vectors are listed corresponding to all blocks in picture 3.

Next, all of picture 2 shall be encoded. As apparent from FIG. 2, block ORIG1 in picture 2 can then be predicted as a mean value between blocks PRED2 and PRED3 in the two encoded pictures 1 and 3. PRED2 and PRED3 are found separately by using an ordinary algorithm, and two movement vectors V2 and V3 indicate where the two blocks used for the prediction are situated. V2 and V3 may be separately transmitted vectors in some embodiments, or alternatively they may be down-scaled versions of movement vector V1, for example, see the article by A. Puri et al. in Signal Processing: Image Communication, Vol. 2, August 1990, NL, pages 127–144; "Video Coding with Motion-Compensated Interpolation for CD-ROM Applications". Thus in this latter situation, the prediction itself is generated as a calculated combination of the PRED2 and PRED3 blocks, i.e. in the simplest manner as a mean value, (PRED2+PRED3)/2.

Such an encoding method often turns out to be efficient, because the prediction of picture 2 comes out well, and for this reason the difference signal ("quantized TRANS") may require only few bits for the transmission.

Down-scaling of movement vectors is also known from an article by A. Nagata et al. in pages 109–116 of the same publication as the previous citation, titled: "Moving Picture Coding System for Digital Storage Media using Hybrid Coding." Both of these citations disclose the use of a group of pictures in which the last picture is reconstructed and then used in conjunction with a picture previous to the group of pictures and scaled-down movement vectors to arrive at the data of the other picture(s) in the group.

The greatest disadvantage of the afore-mentioned method is that for prediction of B pictures, one has to read data from two picture memories (PRED2 and PRED3) into a processing unit, and every such data reading is resource-demanding as to implementation.

SUMMARY OF THE INVENTION

The present invention aims at providing an alternative method of encoding P and B pictures in order to simplify the data reading and to save transmission capacity between picture memories and a processing unit by reducing the amount of data to be transmitted.

According to the present invention as illustrated by the flow chart of FIG. 4, there is provided a method for compression encoding of digital picture video signals, for example, in connection with a transmission of such signals via a narrowband transmission medium, the method comprising the following steps:

a) dividing pictures to be encoded into a number of blocks of a given size, i.e. having a given number of pixels (item 2 of FIG. 4);

b) establishing predictions for each block using blocks in one or several previously encoded pictures and according to predetermined algorithms (item 3 of FIG. 4); and c) providing reconstructed blocks (item 4 of FIG. 4), i.e. blocks having been encoded and decoded in accordance with a predetermined encoding/decoding scheme, using the predictions, characterized in that:

blocks in one and the same picture position, but in N>1 successive pictures, are encoded and decoded together as a group (item 6 of FIG. 4), the last one of the blocks in such a group, i.e. block no. N, is first predicted by a block in an encoded picture prior to the N pictures (item 3 of FIG. 4), and thereafter block no. N is reconstructed using the prediction block and in accordance with the encoding/decoding scheme (item 4 of FIG. 4); and thereafter the reconstructed and decoded block no. N is used in a combination with information from pictures decoded prior to the N picture blocks for producing predictions for the remaining ones of the N blocks in the group (item 5 of FIG. 4), the combination being computed according to an algorithm among the predetermined algorithms whereby all N blocks are also produced in a reconstructed encoded form to be treated together prior to assembling a new group of N blocks from another picture position in the same N pictures in a corresponding manner.

DETAILED DESCRIPTION

According to the present invention, it is not necessary to encode pictures one by one as described above in connection with the prior art techniques. Instead, a number N>1 of blocks having the same position in N successive pictures are encoded "simultaneously". (Regarding the term "simultaneously", this means that the bits produced from the N blocks are combined into one unity, which in the following will be referred to as a "bit unity". Usually this will also mean that all calculating operations for the N blocks are made prior to passing to a new set of blocks. However, this last operation is not strictly necessary. One might contemplate that a manufacturer would find some advantage in making the calculating operations themselves at different times, storing the necessary results and then at a later time pack them together to a unity as mentioned above.)

As an example, it is now demonstrated how to co-encode blocks from two pictures, but the present invention also covers the possibility of encoding blocks from more than two pictures (i.e. from N pictures) simultaneously.

Figure 1:
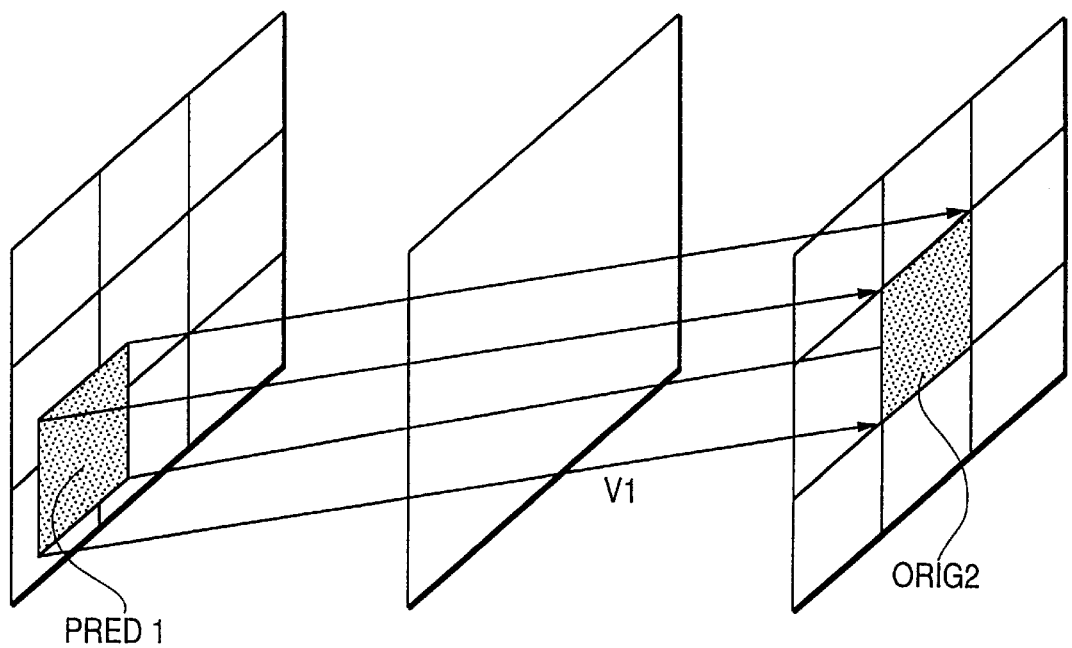
FIG. 1 and FIG. 2 illustrates conventional techniques for prediction.
Figure 3:
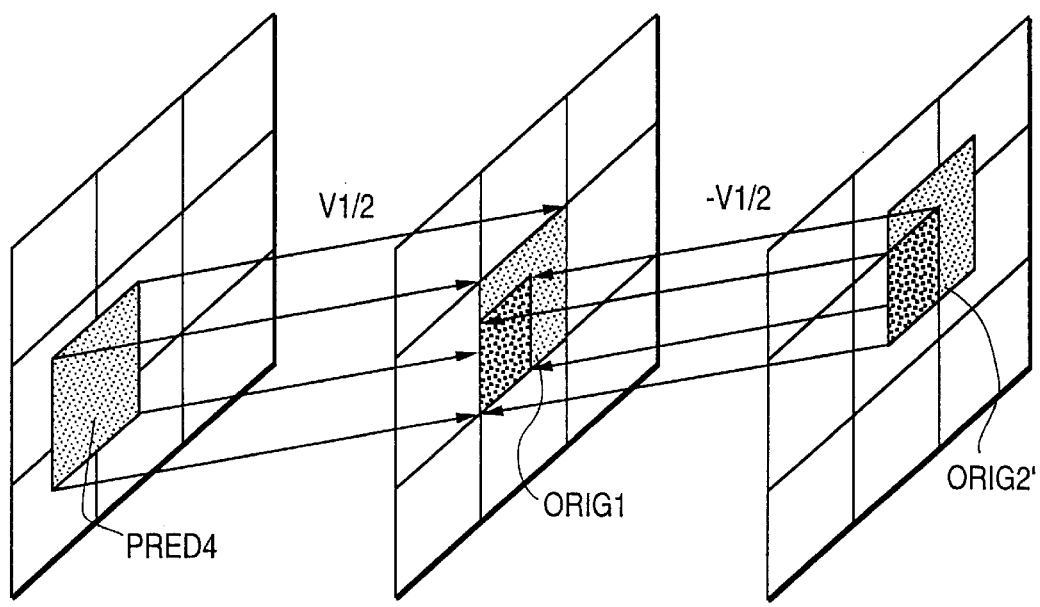
FIG. 3 shows a prediction technique in accordance with the present invention.
Figure 4:
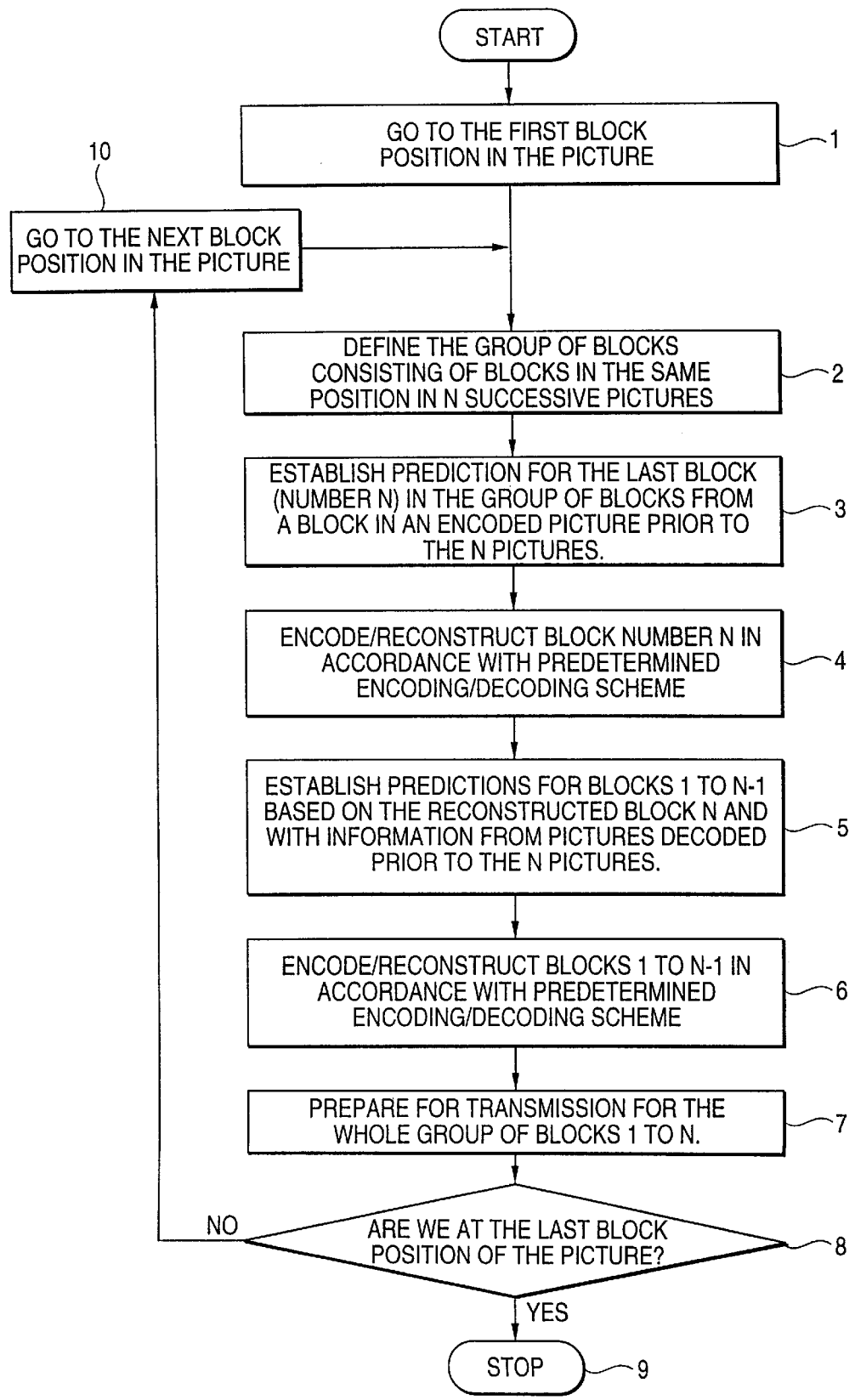
FIG. 4 shows a flow chart of a method for compression encoding digital picture video signals in accordance with the present invention.

While referring to FIG. 1 and FIG. 3, the encoding process starts by encoding block ORIG2 (see FIG. 1) using a prediction from PRED1. This process then leads to the making of a reconstructed block ORIG2'.

Then one passes directly to block ORIG1 in picture 2 (see FIG. 3) which has the same picture position as ORIG2 in picture 3 (see both FIG. 1 and FIG. 3). The prediction to be used for ORIG1 can be formed on the basis of both PRED4 in picture 1, and parts of the recently reconstructed block ORIG2'. The vectors used here are down-scaled from vector VI which was used for preparing a prediction of ORIG2 see FIG. 1). Thus, in this example ½V1 and ½V1 have been used. As apparent from FIG. 3, the dark shaded part of ORIG1 can be predicted as a mean value of PRED4 and ORIG2'. The light shaded part of ORIG1 is predicted only from PRED4.

The strategy outlined above can be extended to comprise more than two pictures (i.e. pictures 2 and 3 as shown), for example, when encoding three pictures, wherein the last picture (picture 4), or rather a block in picture 4, will first be predicted by a block in picture 1, and thereafter a reconstructed block will be prepared in picture 4. Thereafter, a one picture jump back is made, that is to picture 3, in order to attack a block in the same position as the block in picture 4. This block in picture 3 is then predicted by means of parts of the reconstructed block in picture 4, as well as information from decoded picture 1. Finally, in a similar manner, a prediction is made for the block in the same position in picture 2 as a combination of the reconstructed block in picture 4 and information from encoded picture 1. Also in this case, down-scaled vectors from the first vector VI are used such as, for example, down-scaled by a factor ⅓.

In order to return to the example using two pictures, i.e. picture 2 and picture 3 as shown in the drawing figures, the difference signals of the blocks in picture 2 and picture 3 are then grouped together before attacking a block in another picture position. In order to transmit the difference signals of the blocks in picture 2 and picture 3, two difference blocks DIFF1 and DIFF2 are obtained and thereafter two sets of transform coefficients TRANS1 and TRANS2. The bits resulting from these sets of transform coefficients, are then put together into one bit unity so that the transmission of the transform coefficients takes place in a similar manner as if only a single block was encoded.

Figure 2:
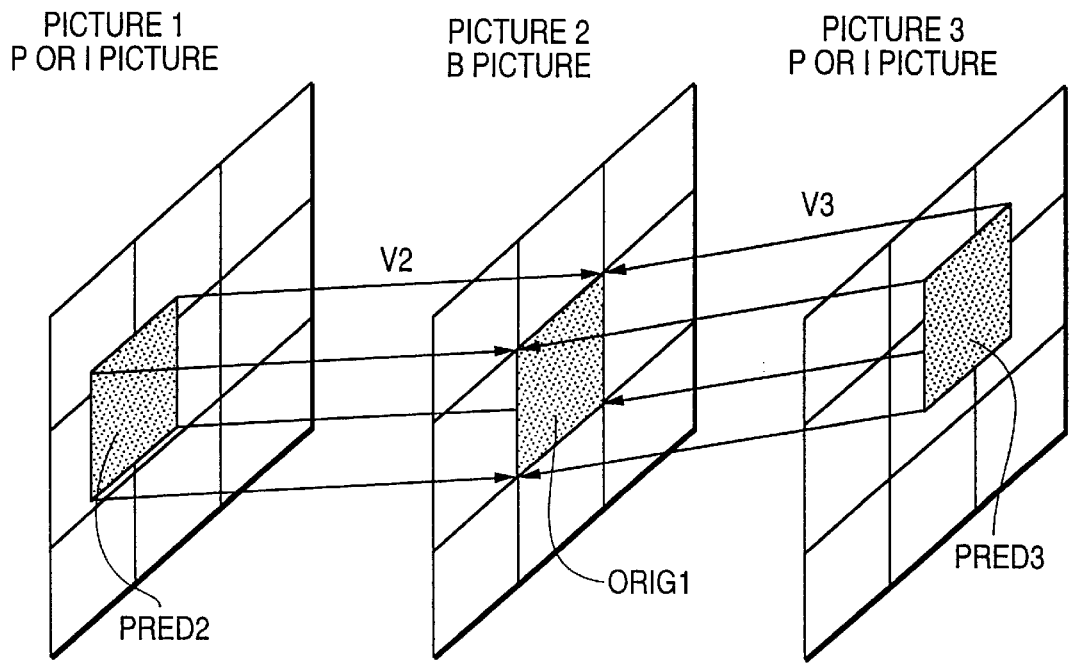

The advantages of the above-described method of encoding B pictures, are as follows:

It is only necessary to read one data block from a picture memory into a processing unit for each picture block to be predicted (PRED1 and PRED4 must be read to predict ORIG1 and ORIG2, while the B picture appearing in FIG. 2, raises a need for reading two blocks per prediction).

Transmission capacity is saved not only by the use of only one vector V1 for the prediction of two blocks, like in the above cited article by Puri et al. but, according to the present invention, capacity is also saved by co-encoding two pictures. This capacity would otherwise have been used for transmitting various side information.

To sum up, blocks in the same positions in the successive pictures to be encoded are encoded together. This is performed by predicting the block of the last picture, i.e. block N, by a block in an encoded picture preceding the N pictures. A reconstructed and decoded block N is then provided, and this block is used further for producing predictions for the remaining ones of the N blocks in the same picture position, wherein information from previously decoded pictures are also utilized together with reconstructed block N. (In the exemplified case, the information mentioned here is constituted by the content of a predicted block in the previously decoded picture, but it is also possible to use other previously decoded pictures.)

Preferably one single vector is then used to indicate a prediction for all the N blocks with a suitable down-scaling.

Accordingly, while the present invention has been described with respect to the particular embodiments, it will be apparent to those skilled in the art that various changes and modifications may be made without departing from the spirit and scope of the invention as defined in the following claims.

I claim:

1. A method for compression encoding digital picture video signals, said method comprising:

a) dividing N pictures to be encoded into a number of blocks having a given number of pixels, wherein N is a natural number;

b) establishing predictions for each block using blocks in one or several previously encoded pictures and according to predetermined algorithms; and c) providing reconstructed blocks using the established predictions, wherein the reconstructed blocks have been encoded and decoded in accordance with a predetermined encoding/decoding scheme;

wherein blocks in one and a same picture position but in N>1 successive pictures are encoded and decoded together as a group;

wherein a last one of the blocks in the group, which is a block of picture number N, is first predicted by a block in an encoded picture prior to the N pictures, and thereafter the block of picture number N is reconstructed using the prediction block and in accordance with the predetermined encoding/decoding scheme; and wherein the reconstructed and decoded block of picture number N is used in a combination with information from pictures decoded prior to the N pictures for producing predictions for the remaining blocks in the group for the N pictures, wherein the combination is computed according to an algorithm among the predetermined algorithms, and wherein all of the blocks of the N pictures from the same picture position are also produced in a reconstructed and encoded form to be treated together, prior to assembling a new group of blocks from another picture position in the N pictures using said method.

2. The method of claim 1, in which blocks from two successive pictures are co-encoded and co-decoded, the block in the second one of the two successive pictures being predicted by a block in the reconstructed version of the picture immediately prior to the first one of the two successive pictures, wherein a vector for indicating shift in a picture plane from the block in the reconstructed version to the block in the second one of the two successive pictures is established as the only necessary information for establishing the prediction of the block in the second one of the two successive pictures, and wherein the vector is used twice in a down-scaled form also for providing a prediction for a block in the first one of the two successive pictures using blocks from the reconstructed versions of the immediately prior picture and the second one of the two successive pictures.

3. The method of claim 1, wherein said method is used in a transmission of the digital picture video signals via a narrowband transmission medium.

* * * * *

UNITED STATES PATENT AND TRADEMARK OFFICE
CERTIFICATE OF CORRECTION

PATENT NO.    : 5,990,961
DATED         : November 23, 1999
INVENTOR(S) :
        Gisle BJONTEGAARD

It is certified that error appears in the above-identified patent and that said Letters Patent is hereby corrected as shown below:

In the drawings,    Fig. 3, delete "(PRIOR ART)".

Signed and Sealed this

Twenty-fourth Day of April, 2001

Attest:

NICHOLAS P. GODICI

Attesting Officer    Acting Director of the United States Patent and Trademark Office